(12) United States Patent
Enomoto (10) Patent No.: US 6,236,518 B1
(45) Date of Patent: May 22, 2001

(54) ZOOM LENS SYSTEM (75) Inventor: Takashi Enomoto, Chiba (JP)

(73) Assignee: Asahi Kogaku Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/469,356

(22) Filed: Dec. 22, 1999

(30) Foreign Application Priority Data

Dec. 24, 1998 (JP) .................................................. 10-368175

(51) Int. Cl.[7] .................................................. G02B 15/14
(52) U.S. Cl. .......................... 359/692; 359/717; 359/740
(58) Field of Search .................................. 359/692, 717, 359/716, 740

(56) References Cited

U.S. PATENT DOCUMENTS

| Re. 35,775 | * | 4/1998 | Betensky et al. | 359/692 |
|---|---|---|---|---|
| 4,906,077 | | 3/1990 | Ito | 359/692 |
| 4,984,877 | | 1/1991 | Ito | 359/692 |
| 5,280,390 | | 1/1994 | Ito | 359/676 |
| 5,309,285 | | 5/1994 | Ito | 359/692 |
| 5,327,290 | * | 7/1994 | Fukushima et al. | 359/692 |
| 5,353,162 | | 10/1994 | Ito et al. | 359/692 |
| 5,434,712 | | 7/1995 | Ito | 359/692 |
| 5,610,767 | * | 3/1997 | Ito | 359/692 |
| 5,663,838 | | 9/1997 | Hasushita et al. | 359/692 |
| 5,687,028 | | 11/1997 | Ito | 359/692 |
| 5,751,498 | | 5/1998 | Ito | 359/692 |
| 5,930,052 | | 7/1999 | Enomoto et al. | 359/692 |

* cited by examiner

Primary Examiner—Scott J. Sugarman
Assistant Examiner—Evelyn A. Lester
(74) Attorney, Agent, or Firm—Greenblum & Bernstein, P.L.C.

(57) ABSTRACT

A zoom lens system includes a positive first lens group and a negative second lens group, in this order from the object. Zooming is performed by varying the distance between the first lens group and the second lens group. The positive lens group includes a negative 1-a sub lens group and a positive 1-b sub lens group, in this order from the object, and the zoom lens system satisfies the following conditions:

$$0.4 < f_W/|f_{1-a}| < 0.7 \quad (1)$$

$$0.07 < d_{a-b}/f_W < 0.14 \quad (2)$$

$$4 < f_T/f_{1-b} < 6 \quad (3)$$

wherein $f_W$ designates the entire focal length at the short focal length extremity;

$f_{1-a}$ designates the focal length of the 1-a sub lens group ($f_{1-a} < 0$);

$d_{a-b}$ designates the distance between the 1-a sub lens group and the 1-b sub lens group;

$f_T$ designates the focal length of the entire the zoom lens system at the long focal length extremity; and $f_{1-b}$ designates the focal length of the 1-b sub lens group.

4 Claims, 7 Drawing Sheets

Fig. 1

Fig.2A
FNO=4.9

— d Line
····· g Line
--- C Line

-0.5   0.5

SPHERICAL
ABERRATION

CHROMATIC
ABERRATION

LATERAL
CHROMATIC
ABERRATION

ASTIGMATISM

DISTORTION

Fig.3A
FNO=6.1

-0.5  0.5

SPHERICAL
ABERRATION

CHROMATIC
ABERRATION

— d Line
---- g Line
--- C Line

LATERAL
CHROMATIC
ABERRATION

ASTIGMATISM

DISTORTION

Fig.4A
FNO=11.5

-0.5  0.5

SPHERICAL
ABERRATION

CHROMATIC
ABERRATION

— d Line
---- g Line
--- C Line

LATERAL
CHROMATIC
ABERRATION

ASTIGMATISM

DISTORTION

Fig. 5

Fig.6A
FNO=4.9

—— d Line
······· g Line
– – C Line

-0.5    0.5

SPHERICAL
ABERRATION

CHROMATIC
ABERRATION

LATERAL
CHROMATIC
ABERRATION

ASTIGMATISM

DISTORTION

Fig.7A
FNO=6.1

—— d Line  
------ g Line  
— — C Line

—— S  
— — M

-0.5   0.5

-0.05   0.05

-0.5   0.5

-5.0(%) 5.0

SPHERICAL ABERRATION

CHROMATIC ABERRATION

LATERAL CHROMATIC ABERRATION

ASTIGMATISM

DISTORTION

Fig.8A
FNO=11.5

—— d Line  
------ g Line  
— — C Line

—— S  
— — M

-0.5   0.5

-0.05   0.05

-0.5   0.5

-5.0(%) 5.0

SPHERICAL ABERRATION

CHROMATIC ABERRATION

LATERAL CHROMATIC ABERRATION

ASTIGMATISM

DISTORTION

Fig. 9

Fig.10A
FNO=4.9

SPHERICAL
ABERRATION
CHROMATIC
ABERRATION

— d Line
······ g Line
— — C Line

Fig.10B
W=28.4

LATERAL
CHROMATIC
ABERRATION

Fig.10C
W=28.4

ASTIGMATISM

DISTORTION

Fig. 13

ZOOM LENS SYSTEM

BACKGROUND OF THE INVENTION

1. Field of the Invention

The present invention relates to a zoom lens system for a compact camera, in particular, relates to achieving high zoom ratio and miniaturization of the zoom lens system.

2. Description of the Related Art

In a zoom lens system for a compact camera, there is no need to provide a long back focal distance, unlike a zoom lens system for a single lens reflex (SLR) camera which requires a space for providing a mirror behind the photographing lens system. Accordingly, a compact camera generally employs a telephoto type lens system in which positive and negative lens groups are provided in this order from the object, while a SLR camera generally employs a retrofocus type lens system in which negative and positive lens groups are provided in this order from the object.

If a zoom lens system is constituted by a two-lens-group arrangement, the number of lens elements therein can be reduced, and the structure thereof can be simplified, so that a small and light-weight zoom lens system can be achieved, and further, such a zoom lens system is advantageous in regard to production costs. Therefore a two-lens-group arrangement has frequently been employed in a zoom lens system for a compact camera. However, in a two-lens-group zoom lens system, if attempts are made to obtain a higher zoom ratio and further miniaturization, field curvature becomes larger at intermediate focal lengths in a zooming range, and thereby it is difficult to achieve a higher zoom ratio and further miniaturization.

SUMMARY OF THE INVENTION

It is an object of the present invention to provide a miniaturized two-lens-group zoom lens system of a telephoto type, which can reduce the occurrence of field curvature at intermediate focal lengths, and can obtain higher zoom ratio (i.e., the focal length at the long focal length extremity/the focal length at the short focal length extremity).

In order to achieve the above mentioned object, there is provided a zoom lens system including a positive first lens group and a negative second lens group, in this order from the object. Zooming is performed by varying the distance between the first lens group and the second lens group. The positive first lens group includes a negative 1-a sub lens group (a negative first sub lens group) and a positive 1-b sub lens group (a positive second sub lens group), in this order from the object, and the zoom lens system satisfies the following conditions:

$$0.4 < f_W/|f_{1-a}| < 0.7 \quad (1)$$

$$0.07 < d_{a-b}/f_W < 0.14 \quad (2)$$

$$4 < f_T/f_{1-b} < 6 \quad (3)$$

wherein $f_W$ designates the entire focal length at the short focal length extremity;

$f_{1-a}$ designates the focal length of the 1-a sub lens group ($f_{1-a} < 0$);

$d_{a-b}$ designates the distance between the 1-a sub lens group and the 1-b sub lens group;

$f_T$ designates the focal length of the entire the zoom lens system at the long focal length extremity; and $f_{1-b}$ designates the focal length of the 1-b sub lens group.

The zoom lens system according to the present invention preferably satisfies the following condition:

$$0.70 < TL(L)/f_T < 0.86 \quad (4)$$

wherein

TL(L) designates the distance from the most object-side surface of the first lens group to the image plane.

In the zoom lens system according to the present invention, it is preferable for the negative second lens group to include a lens element having an aspherical surface which satisfies the following condition:

$$0.2 < \Delta V_{ASP} < 0.4 \quad (5)$$

wherein $\Delta V_{ASP}$ designates the amount of change in the distortion coefficient due to the aspherical surface when the focal length at the short focal-length extremity is assumed to be 1.0.

Furthermore, according to the zoom lens system of the present invention, a diaphragm is provided between the positive first lens group and the negative second lens group. The diaphragm is preferably controlled so that the mechanical full-aperture diameter of the diaphragm at the short focal length extremity is smaller than the mechanical full-aperture diameter thereof at the long focal length extremity.

The present disclosure relates to subject matter contained in Japanese Patent Application No.Hei-10-368175 (filed on Dec. 24, 1998) which is expressly incorporated herein by reference in its entirety.

BRIEF DESCRIPTION OF THE DRAWINGS

The invention will be discussed below in detail with reference to the accompanying drawings, in which.

DESCRIPTION OF THE PREFERRED EMBODIMENTS

Figure 13:
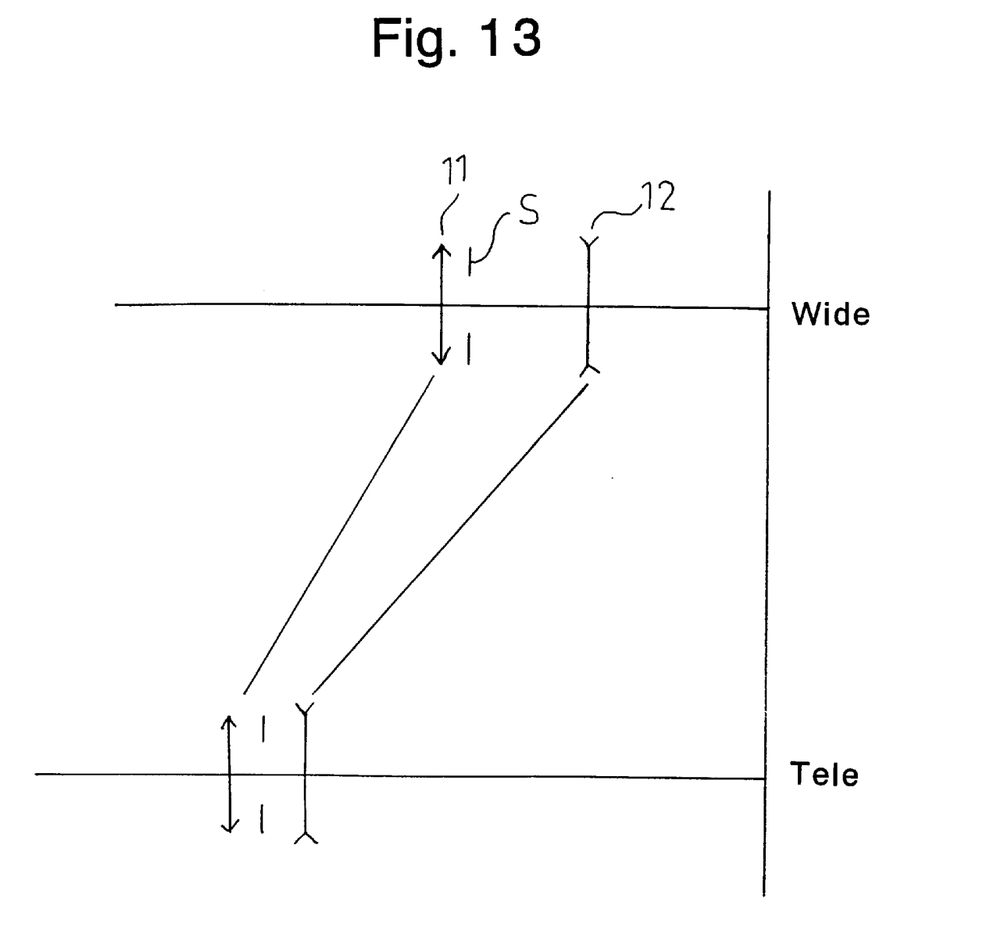
FIG. 13 is a diagram showing the lens-group moving paths of a zoom lens system according to the present invention.

The zoom lens system, as shown in FIG. 13, includes a positive first lens group 11, and a negative second lens group 12. Zooming is performed by varying the distance between the first lens group 11 and the second lens group 12. According to the lens-group moving paths of the zoom lens system shown in FIG. 13, when zooming is performed from the short focal length extremity toward the long focal length extremity, the first lens group 11 and the second lens group 12 move toward the object while the distance therebetween decreases. A diaphragm S is provided between the first lens group 11 and the second lens group 12, and moves integrally with the first lens group 11. Focusing is performed by either the first lens group 11 only or by the entire lens system.

Figure 1:
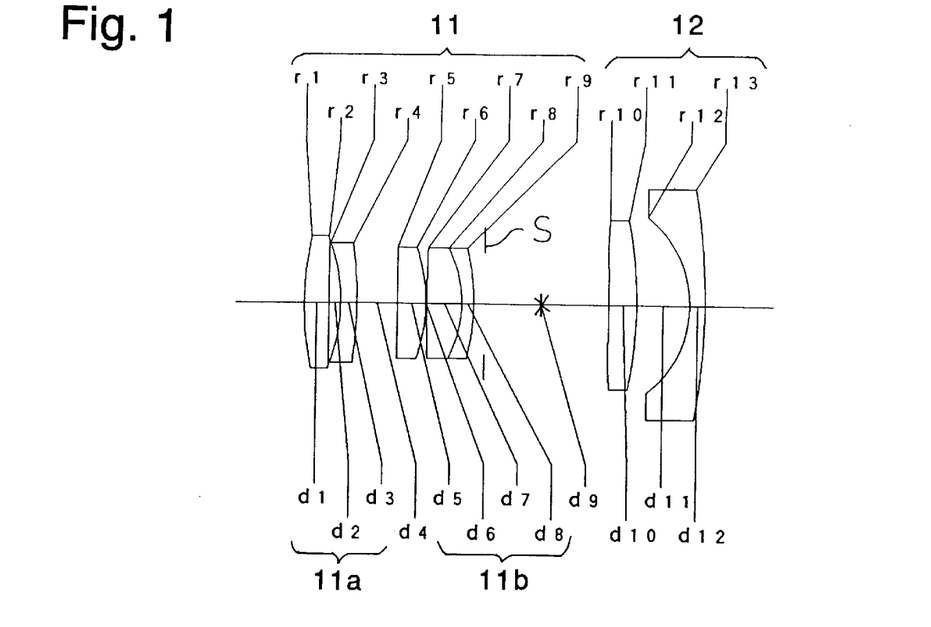
FIG. 1 is a lens arrangement of a first embodiment of a zoom lens system according to the present invention.
Figures 2A, 2B:
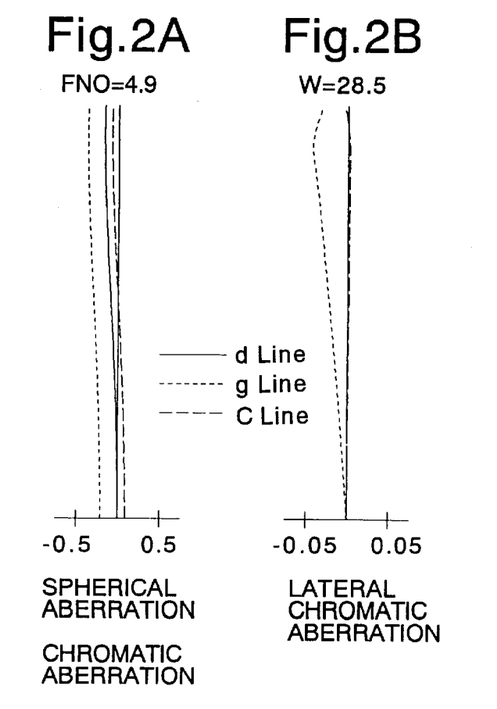
FIGS. 2A, 2B, 2C and 2D show aberration diagrams of the lens arrangement of FIG. 1 at the short focal length extremity.
Figure 2C:
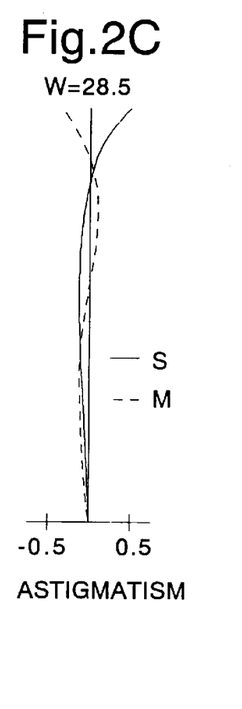
Figure 2D:
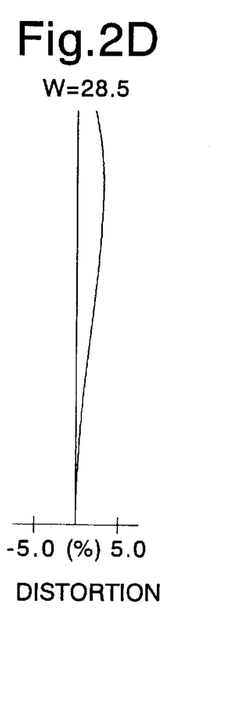
Figures 3A, 3B:
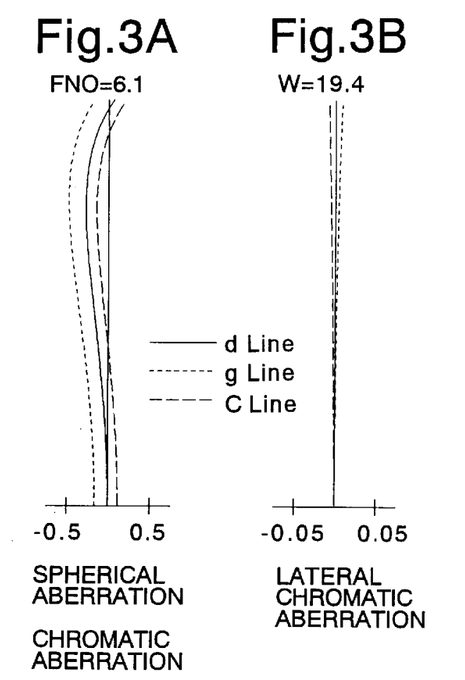
FIGS. 3A, 3B, 3C and 3D show aberration diagrams of the lens arrangement of FIG. 1 at an intermediate focal length.
Figure 3C:
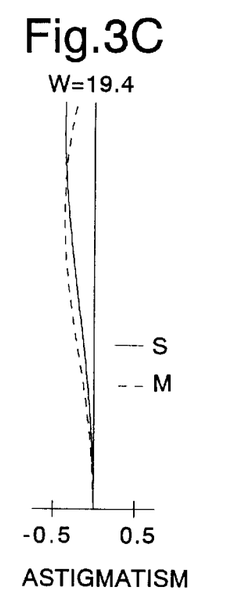
Figure 3D:
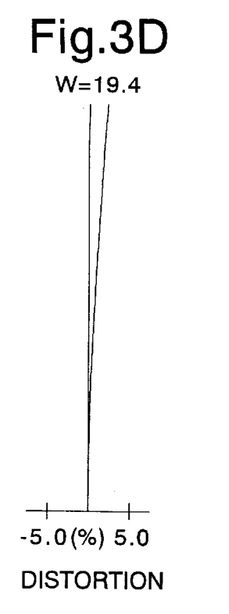
Figures 4A, 4B:
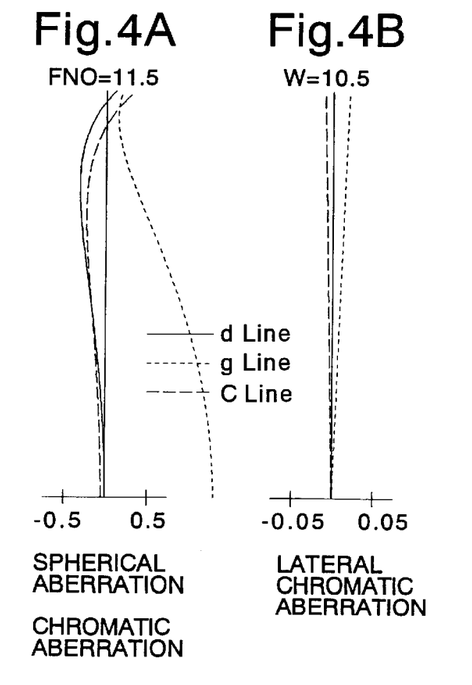
FIGS. 4A, 4B, 4C and 4D show aberration diagrams of the lens arrangement of FIG. 1 at the long focal length extremity.
Figure 4C:
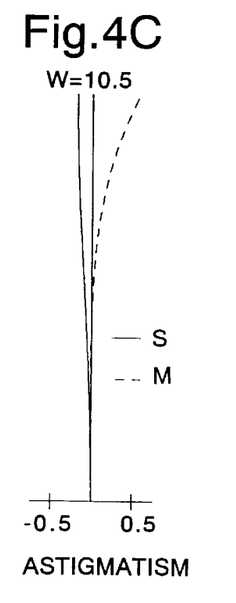
Figure 4D:
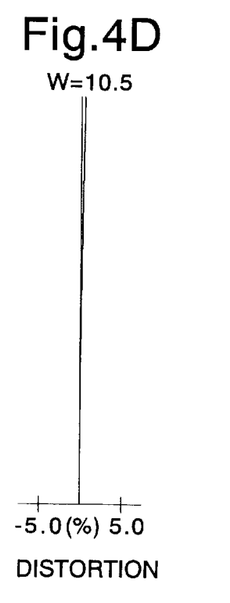
Figure 5:
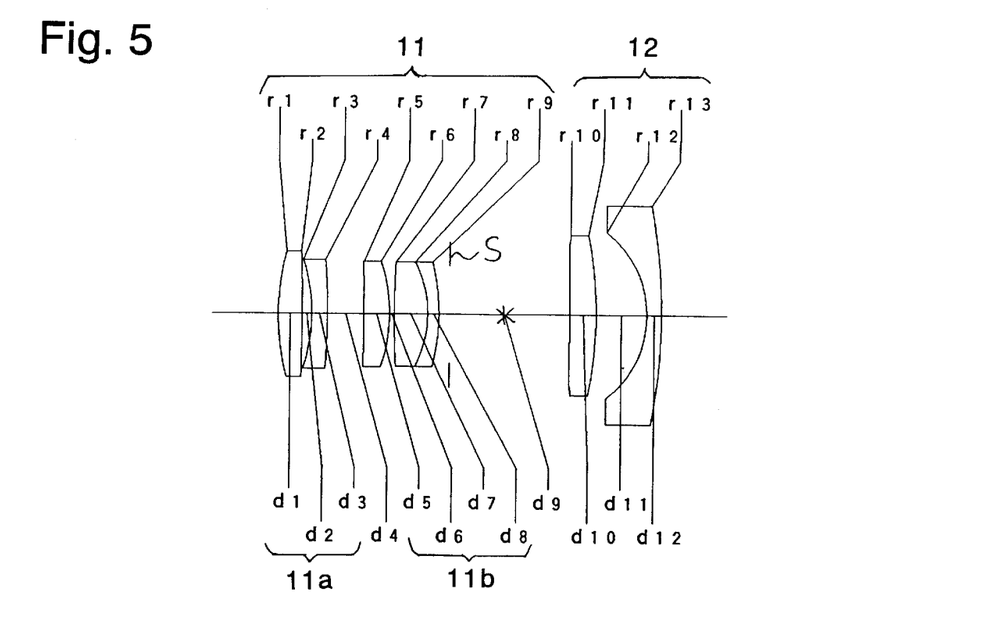
FIG. 5 is a lens arrangement of a second embodiment of a zoom lens system according to the present invention.
Figure 6A:
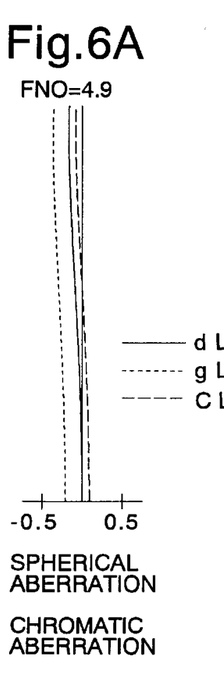
FIGS. 6A, 6B, 6C and 6D show aberration diagrams of the lens arrangement of FIG. 5 at the short focal length extremity.
Figure 6B:
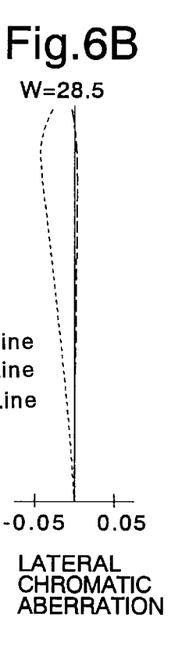
Figure 6C:
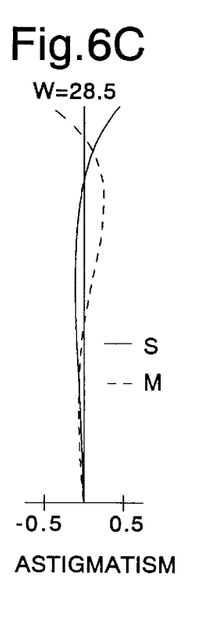
Figure 6D:
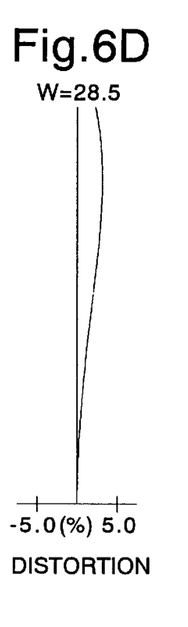
Figures 7A, 7B:
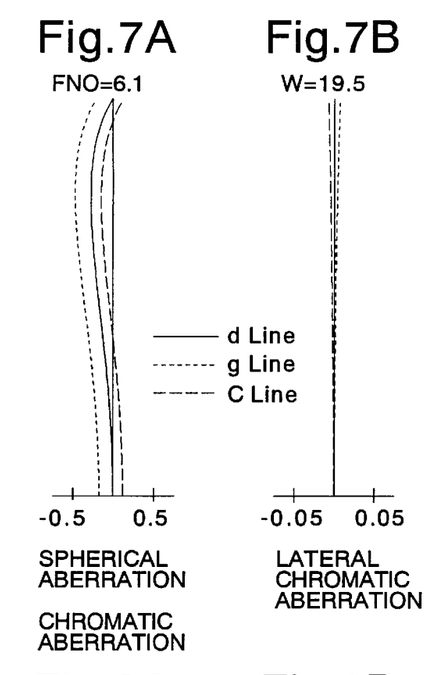
FIGS. 7A, 7B, 7C and 7D show aberration diagrams of the lens arrangement of FIG. 5 at an intermediate focal length.
Figure 7C:
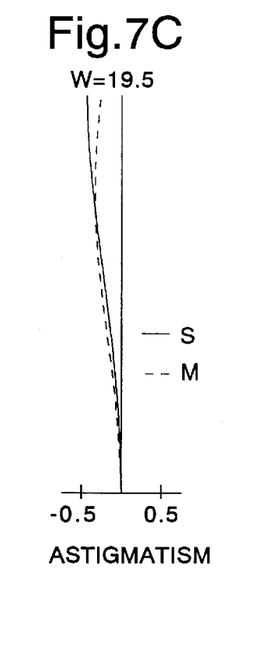
Figure 7D:
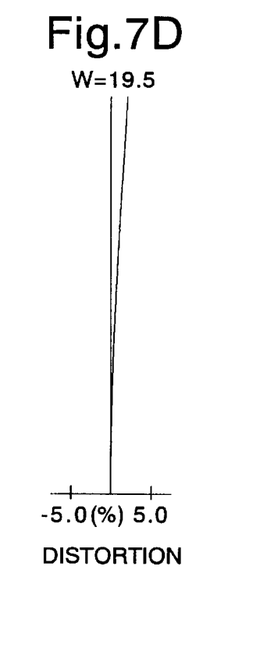
Figures 8A, 8B:
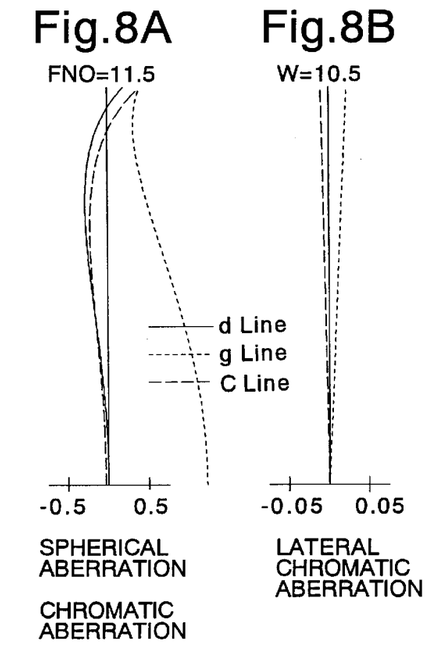
FIGS. 8A, 8B, 8C and 8D show aberration diagrams of the lens arrangement of FIG. 5 at the long focal length extremity.
Figure 8C:
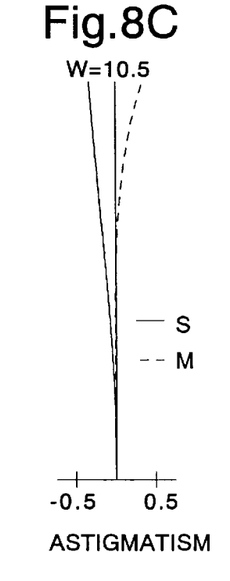
Figure 8D:
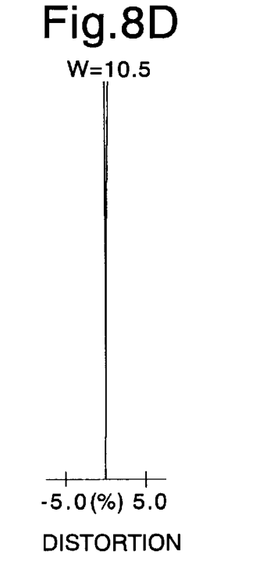
Figure 9:
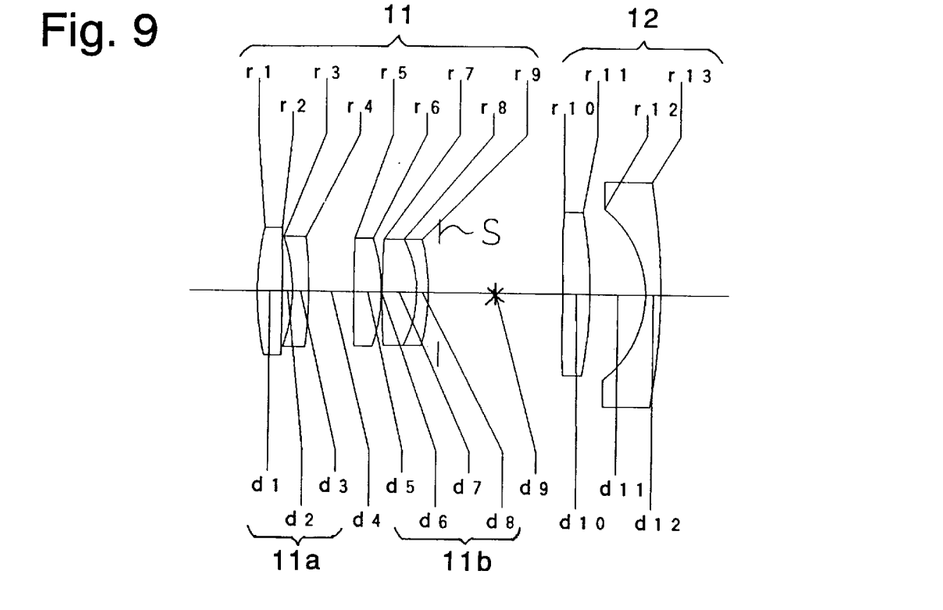
FIG. 9 is a lens arrangement of a third embodiment of a zoom lens system according to the present invention.
Figures 10A, 10B:
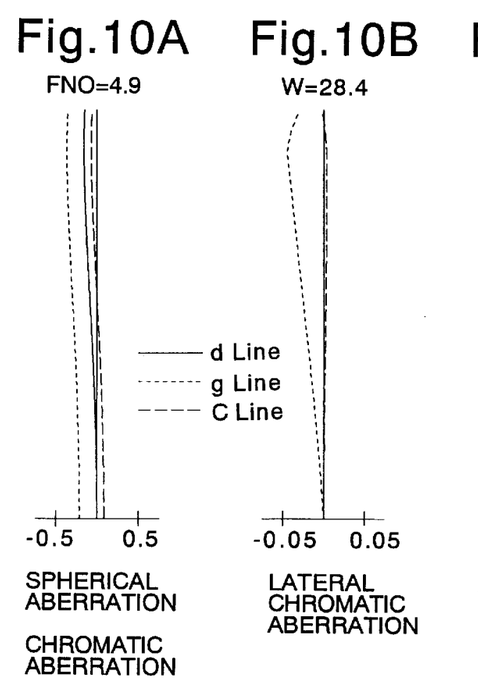
FIGS. 10A, 10B, 10C and 10D show aberration diagrams of the lens arrangement of FIG. 9 at the short focal length extremity.
Figure 10C:
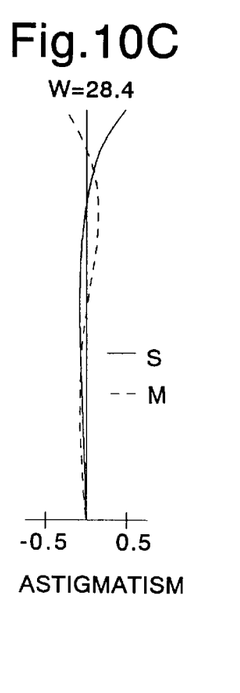
Figure 10D:
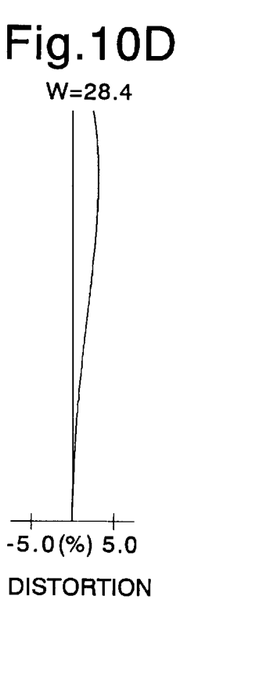
Figures 11A, 11B:
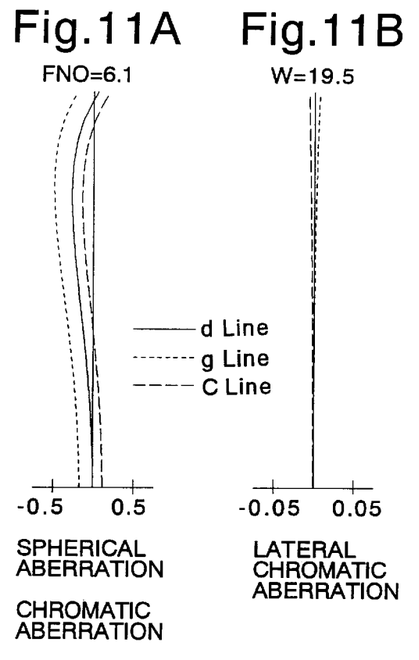
FIGS. 11A, 11B, 11C and 11D show aberration diagrams of the lens arrangement of FIG. 9 at an intermediate focal length.
Figure 11C:
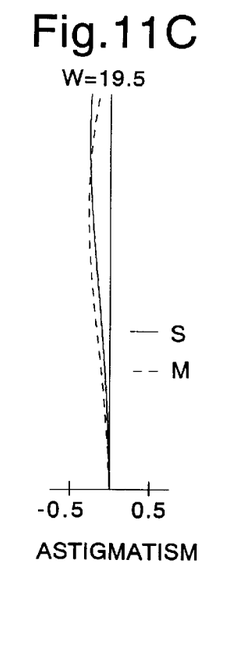
Figure 11D:
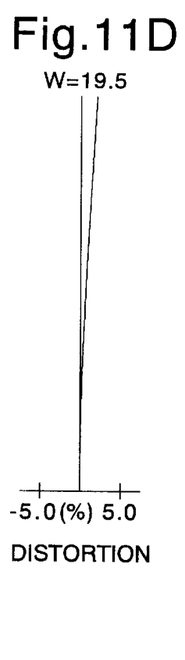
Figures 12A, 12B:
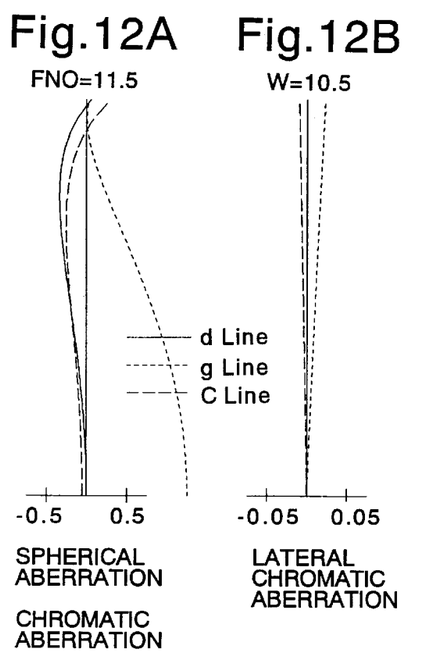
FIGS. 12A, 12B, 12C and 12D show aberration diagrams of the lens arrangement of FIG. 9 at the long focal length extremity.
Figure 12C:
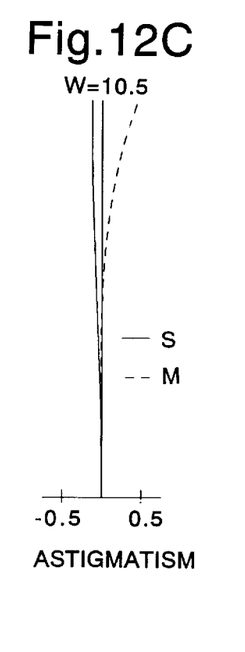
Figure 12D:
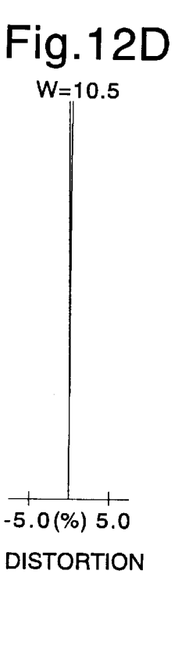

In the first through third embodiments as shown in FIGS. 1, 5 and 9 respectively, the positive first lens group 11 includes a negative 1-a sub lens group 11a (a negative first sub lens group) and a positive 1-b sub lens group 11b (a positive second sub lens group), in this order from the object.

Under the condition that the positive first lens group 11 is divided into the negative 1-a sub lens group 11a and the positive 1-b sub lens group 11b, (i) when suitable power is given to the negative 1-a sub lens group 11a, field curvature is corrected due to the divergence of the negative 1-a sub lens group 11a;

(ii) when the negative 1-a sub lens group 11a is moved away from the positive 1-b sub lens group 11b, field curvature is corrected since the divergence of the negative 1-a sub lens group 1ha is increased; and (iii) when strong power is given to the positive 1-b sub lens group 11b, the power of the positive first lens group 11 becomes strong, and thereby the traveling distance thereof is decreased upon zooming.

In each embodiment, the zoom lens system utilizes the above characteristics in order to attain higher magnification and further miniaturization. In other words, suitable power is given to the negative 1-a sub lens group 11a, the negative 1-a sub lens group 11a is moved away from the positive 1-b sub lens group 11b, and strong power is given to the positive 1-b sub lens group 11b.

Furthermore, by suitably positioning a lens element having at least one aspherical surface, it becomes possible to reduce the number of lens elements in the negative second lens group 12.

In the zoom lens system, the diaphragm S which moves integrally with the positive first lens group 11 is provided between the positive first lens group 11 and the negative second lens group 12. If the diameter of the mechanical full-aperture of the diaphragm S is determined with consideration of an adequate F-number at the long focal length extremity, in zoom lens systems like those of the embodiments in which the focal length at the short focal length extremity is made shorter and a higher zoom ratio is obtained, the F-number at the short focal length extremity tends to be smaller. As a result, difficulties occur in the correcting of aberrations. Further in order to maintain peripheral illumination, the diameter and thickness of the first lens group 11 have to be increased.

In order to solve the above problems, the diaphragm S is preferably controlled so that the mechanical full-aperture diameter of the diaphragm S at the short focal length extremity is smaller than the mechanical full-aperture diameter thereof at the long focal length extremity.

Condition (1) specifies the power of the negative 1-a sub lens group 11a. By satisfying this condition, field curvature can be corrected while the occurrence of aberrations in the negative 1-a sub lens group 11a is reduced.

If $f_W/|f_{1-a}|$ exceeds the upper limit of condition (1), aberrations in the negative 1-a sub lens group increase, and the correcting thereof becomes difficult.

If $f_W/|f_{1-a}|$ exceeds the lower limit of condition (1), an effect on divergence in the negative 1-a sub lens group becomes small, and the correcting of field curvature becomes insufficient.

Condition (2) specifies the distance between the negative 1-a sub lens group 11a and the positive 1-b sub lens group 11b. By satisfying this condition, field curvature can be corrected within an extent the correcting thereof does not influence the entire length of the zoom lens system.

If $d_{a-b}/f_W$ exceeds the upper limit of condition (2), the entire length of the zoom lens system is influenced by the correcting of field curvature, and thereby the zoom lens system cannot be miniaturized.

If $d_{a-b}/f_W$ exceeds the lower limit of condition (2), an effect on divergence becomes small, and the correcting of field curvature becomes insufficient.

Condition (3) specifies the power of the positive 1-b sub lens group 11b. By satisfying this condition, the traveling distance of the positive first lens group is decreased, and the zoom lens system can be miniaturized, while the occurrence of aberrations in the positive 1-b sub lens group 11b is reduced.

If $f_T/f_{1-b}$ exceeds the upper limit of condition (3), aberrations in the positive 1-b sub lens group 11b increase, and the correction thereof becomes difficult.

If $f_T/f_{1-b}$ exceeds the lower limit of condition (3), the 10 traveling distance of the positive 1-b sub lens group 11b increases upon zooming, and thereby the zoom lens system cannot be miniaturized.

Condition (4) specifies the ratio of the entire length of the zoom lens system at the long focal length extremity to the focal length at the long focal length extremity. By satisfying this condition, the zoom lens system can be miniaturized while the occurrence of aberrations at focal lengths in a range determined by the short focal length extremity and the long focal length extremity is reduced.

If $TL(L)/f_T$ exceeds the upper limit of condition (4), the zoom lens system cannot be sufficiently miniaturized.

If $TL(L)/f_T$ exceeds the lower limit of condition (4), the correcting of aberrations at focal lengths in a range determined by the short focal length extremity and the long focal length extremity cannot be sufficiently made.

Condition (5) specifies the amount of asphericity. By satisfying this condition, the occurrence of distortion can be suitably reduced.

If $\Delta V_{ASP}$ exceeds the upper limit of condition (5), the amount of asphericity increases, and thereby it becomes difficult to produce a lens element having the aspherical surface.

If $\Delta V_{ASP}$ exceeds the lower limit of condition (5), the effect on the correcting of distortion by the aspherical surface is small, and thereby distortion cannot be corrected sufficiently.

The relation between the aspherical coefficients and the aberration coefficients will be herein discussed. The shape of the aspherical surface can be generally defined as follows:

$$x=cy^2/\{1+[1-(1+K)c^2y^2]^{1/2}\}+A4y^4+A6y^6+A8y^8+A10y^{10}+\ldots;$$

wherein:
- x designates a distance from a tangential plane of an aspherical vertex;
- y designates a distance from the optical axis;
- c designates a curvature of the aspherical vertex (1/R);
- K designates a conic constant;
- A4 designates a fourth-order aspherical coefficient;
- A6 designates a sixth-order aspherical coefficient;
- A8 designates a eighth-order aspherical coefficient; and
- A10 designates a tenth-order aspherical coefficient.

In this equation, to obtain the aberration coefficients, the following substitution is made to replace K with "0" (Bi=Ai when K=0).

$B4=A4+Kc^3/8$ $B6=A6+(K^2+2K)c^5/16$ $B8=A8+5(K^3+3K^2+3K)c^7/128$ $B10=A10+7(K^4+4K^3+6K^2+4K)c^9/256$

Hence, the following equation is obtained:

$$x=cy^2/\{1+[1-c^2y^2]^{1/2}\}+B4y^4+B6y^6+B8y^8+B10y^{10}+\ldots$$

When the focal length f is normalized to 1.0, the resultant value is transformed as shown below. Namely, the following equations are substituted into the above equation:

$X=x/f,\ Y=y/f,\ C=fc\alpha4=f^3B4,\ \alpha6=f^5B6,\ \alpha8=f^7B8,\ \alpha10=f^9B10$ Accordingly, the following equation is obtained.

$$X=CY^2/\{1+[1-C^2Y^2]^{1/2}\}+\alpha4Y^4+\alpha6Y^6+\alpha8Y^8\alpha10Y^{10}+\ldots$$

The second and subsequent terms define the amount of asphericity of the aspherical surface.

Then the third order aberration contributions due to the fourth order aspherical coefficient α4 are obtained as follows:

$\Delta I=h^4\Phi$ $\Delta II=h^3k\Phi$ $\Delta III=h^2k^2\Phi$ $\Delta IV=h^2k^2\Phi$ $\Delta V=hk^3\Phi$ wherein
- I designates the spherical aberration coefficient;
- II designates the coma coefficient;
- III designates the astigmatism coefficient;
- IV designates the sagittal field of curvature coefficient;
- V designates the distortion coefficient;
- h1 designates the height at which a paraxial on-axis ray strikes the first surface of an optical system including an aspherical surface;
- h designates the height at which the paraxial on-axis ray strikes the aspherical surface of the optical system when h1 is 1 (one);
- k1 designates the height at which a paraxial off-axis ray, which comes from an off-axis object point and passes through the center of the entrance pupil, strikes the first surface of an optical system including an aspherical surface;
- k designates the height at which the paraxial off-axis ray strikes the aspherical surface of the optical system when k1 is –1 (minus one); and $\Phi=8(N'-N)\alpha4$ wherein
- N designates the refractive index of a medium on the side of the object with respect to the aspherical surface;
- N' designates the refractive index of a medium on the side of the image with respect to the aspherical surface.

Specific numerical examples will herein be discussed. In the diagrams of chromatic aberration (axial chromatic aberration) represented by spherical aberration, the solid lines and the two types of dotted lines respectively indicate spherical aberration with respect to the d, g and C lines. Also, in the diagrams of lateral chromatic aberration, the solid lines and the two types of dotted lines respectively indicate magnification with respect to the d, g and C lines. S designates the sagittal image, and M designates the meridional image. In the tables, $F_{NO}$ designates the F-number, f designates the focal length of the entire lens system, w designates the half angle-of-view (°), $f_B$ designates the back focal distance, R designates the radius of curvature, D designates the lens thickness or space between lens surfaces, $N_d$ designates the refractive index with respect to the d-line, ν designates the Abbe number, and ap designates the mechanical full-aperture of the diaphragm.

[Embodiment 1]

FIG. 1 is a lens arrangement of the first embodiment of a zoom lens system. FIGS. 2A through 2D, FIGS. 3A through 3D and FIGS. 4A through 4D show aberration diagrams of the lens arrangement of FIG. 1 respectively at the short focal length extremity, an intermediate focal length and the long focal length extremity. Table 1 shows the numerical data thereof. Surface Nos. 1 through 9 designate the positive first lens group 11, and surface Nos. 10 through 13 designate the negative second lens group 12. The first lens group 11 includes a positive first lens element (surface Nos. 1 and 2), a negative second lens element (surface Nos. 3 and 4), a positive third lens element (surface Nos. 5 and 6), and a cemented sub lens group having a positive fourth lens element (surface Nos. 7 and 8) and a negative fifth lens element (surface Nos. 8 and 9) in this order from the object. The positive first lens element and the negative second lens element constitute the negative 1-a sub lens group 1ha, and the third, fourth and fifth lens elements constitute the positive 1-b sub lens group 11b. The second lens group 12 is constituted by the positive sixth lens element (surface Nos. 10 and 11) and a negative seventh lens element (surface Nos. 12 and 13).

[Table 1]

$F_{NO}$=1:4.9–6.1–11.5 f=39.00–60.00–116.00 (Zoom Ratio: 2.97)

W=28.5–19.4–10.5

$f_B$=9.46–25.84–69.51 ap=Φ7.2–Φ9.2–Φ9.2

| Surface No. | R | D | Nd | ν |
| --- | --- | --- | --- | --- |
| 1 | 27.220 | 2.30 | 1.48498 | 65.5 |
| 2 | –577.678 | 1.06 | — | — |
| 3 | –15.715 | 1.50 | 1.84700 | 35.1 |
| 4 | –38.270 | 3.77 | — | — |
| 5 | 594.793 | 2.62 | 1.48000 | 67.2 |
| 6 | –15.449 | 0.10 | — | — |

-continued

| Surface No. | R | D | Nd | ν |
|---|---|---|---|---|
| 7 | 193.244 | 3.26 | 1.51968 | 52.0 |
| 8 | −10.385 | 1.10 | 1.80400 | 46.6 |
| 9 | −19.977 | 1.00 | — | — |
| Diaphragm | ∞ | 11.40-6.44-2.00 | — | — |
| 10* | −101.408 | 2.53 | 1.58547 | 29.9 |
| 11 | −37.555 | 4.85 | — | — |
| 12 | −10.106 | 1.40 | 1.74566 | 51.4 |
| 13 | −59.033 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 10 | 0.00 | $0.7247 \times 10^{-4}$ | $0.3573 \times 10^{-6}$ | $0.3002 \times 10^{-8}$ |

[Embodiment 2]

FIG. 5 is a lens arrangement of the second embodiment of a zoom lens system. FIGS. 6A through 6D, FIGS. 7A through 7D and FIGS. 8A through 8D show aberration diagrams of the lens arrangement of FIG. 5 respectively at the short focal length extremity, an intermediate focal length and the long focal length extremity. Table 2 shows the numerical data thereof. The basic lens arrangement is the same as the first embodiment.

[Table 2]

$F_{NO}$=1:4.9–6.1–11.5 f=39.00–60.00–116.00 (Zoom Ratio: 2.97)

W=28.5–19.5–10.5

$f_B$=9.34–25.81–69.76 ap=Φ7.3–Φ9.2–Φ9.3

| Surface No. | R | D | Nd | ν |
|---|---|---|---|---|
| 1 | 23.610 | 2.30 | 1.48000 | 68.1 |
| 2 | −187.763 | 0.90 | — | — |
| 3 | −16.948 | 1.50 | 1.84700 | 38.7 |
| 4 | −71.756 | 3.50 | — | — |
| 5 | −234.020 | 2.49 | 1.48000 | 67.2 |
| 6 | −15.444 | 0.45 | — | — |
| 7 | 83.516 | 3.23 | 1.51481 | 53.4 |
| 8 | −10.724 | 1.10 | 1.80400 | 46.6 |
| 9 | −19.638 | 1.00 | — | — |
| Diaphragm | ∞ | 11.63-6.55-2.00 | — | — |
| 10* | −99.168 | 2.53 | 1.58547 | 29.9 |
| 11 | −36.994 | 4.85 | — | — |
| 12 | −10.106 | 1.40 | 1.74416 | 51.5 |
| 13 | −56.878 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 10 | 0.00 | $0.7331 \times 10^{-4}$ | $0.2608 \times 10^{-6}$ | $0.3627 \times 10^{-8}$ |

[Embodiment 3]

FIG. 9 is a lens arrangement of the third embodiment of a zoom lens system. FIGS. 10A through 10D, FIGS. 11A through 11D and FIGS. 12A through 12D show aberration diagrams of the lens arrangement of FIG. 9 respectively at the short focal length extremity, an intermediate focal length and the long focal length extremity. Table 3 shows the numerical data thereof. The basic lens arrangement is the same as the first embodiment.

[Table 3]

$F_{NO}$=1:4.9–6.1–11.5 f=39.00–60.00–116.00 (Zoom Ratio: 2.97)

W=28.4–19.5–10.5

$f_B$=9.61–26.04–69.85 ap=Φ7.4–Φ59.2–Φ9.2

| Surface No. | R | D | Nd | ν |
|---|---|---|---|---|
| 1 | 29.191 | 2.30 | 1.48000 | 68.2 |
| 2 | −225.022 | 0.93 | — | — |
| 3 | −16.353 | 1.50 | 1.84700 | 38.4 |
| 4 | −49.410 | 4.20 | — | — |
| 5 | 215.568 | 2.57 | 1.48085 | 74.2 |
| 6 | −16.409 | 0.10 | — | — |
| 7 | 106.153 | 3.21 | 1.51735 | 52.6 |
| 8 | −10.847 | 1.10 | 1.80400 | 46.6 |
| 9 | −20.404 | 1.00 | — | — |
| Diaphragm | ∞ | 11.57-6.59-2.14 | — | — |
| 10* | −129.441 | 2.53 | 1.58547 | 29.9 |
| 11 | −40.551 | 5.17 | — | — |
| 12 | −10.208 | 1.40 | 1.75042 | 51.1 |
| 13 | −61.813 | — | — | — |

*designates the aspherical surface which is rotationally symmetrical with respect to the optical axis.

Aspherical surface data (the aspherical surface coefficients not indicated are zero (0.00)):

| Surface No. | K | A4 | A6 | A8 |
|---|---|---|---|---|
| 10 | 0.00 | $0.6795 \times 10^{-4}$ | $-0.2823 \times 10^{-6}$ | $0.3104 \times 10^{-8}$ |

The numerical values of each condition of each embodiment are shown in Table 4.

TABLE 4

|  | Embod. 1 | Embod. 2 | Embod. 3 |
|---|---|---|---|
| Condition (1) | 0.429 | 0.512 | 0.554 |
| Condition (2) | 0.097 | 0.090 | 0.108 |
| Condition (3) | 5.353 | 5.639 | 5.553 |
| Condition (4) | 0.836 | 0.836 | 0.845 |
| Condition (5) | 0.307 | 0.327 | 0.288 |

As can be understood from Table 4, each embodiment satisfies each condition. Furthermore, as can be understood form the aberration diagrams, the various aberrations are adequately corrected.

According to the above description, a miniaturized two-lens-group zoom lens system of a telephoto type, which reduces the occurrence of field curvature at intermediate focal lengths, and attains a higher zoom ratio, can be obtained.

What is claimed is:

1. A zoom lens system comprising a positive first lens group and a negative second lens group, in this order from an object;

wherein zooming is performed by varying distance between said first lens group and said second lens group;

wherein said positive first lens group comprises a negative first sub lens group, and a positive second sub lens group, in this order from said object;

wherein said zoom lens system satisfies the following conditions:

$$0.4 < f_W/|f_{1-a}| < 0.7$$

$$0.07 < d_{a-b}/f_W < 0.14$$

$$4 < f_T/f_{1-b} < 6$$

wherein $f_W$ designates the entire focal length at the short focal length extremity;

$f_{1-a}$ designates the focal length of said negative first sub lens group ($f_{1-a} < 0$);

$d_{a-b}$ designates the distance between said negative first sub lens group and said positive second sub lens group;

$f_T$ designates the focal length of the entire the zoom lens system at the long focal length extremity; and $f_{1-b}$ designates the focal length of said positive second sub lens group.

2. The zoom lens system according to claim 1, wherein said zoom lens system satisfies the following condition:

$$0.70 < TL(L)/f_T < 0.86$$

wherein

TL(L) designates the distance from the most object-side surface of said first lens group to the image plane.

3. The zoom lens system according to claim 1, wherein said negative second lens group comprises a lens element having an aspherical surface which satisfies the following condition:

$$0.2 < \Delta V_{ASP} < 0.4$$

wherein $\Delta V_{ASP}$ designates the amount of change in the distortion coefficient due to the aspherical surface when the focal length at the short focal-length extremity is assumed to be 1.0.

4. The zoom lens system according to claim 1, wherein a diaphragm is provided between said positive first lens group and said negative second lens group, wherein said diaphragm is controlled so that the mechanical full-aperture diameter of said diaphragm at the short focal length extremity is smaller than the mechanical full-aperture diameter at the long focal length extremity.

* * * * *